United States Patent [19]
Elevitch

[11] 3,766,047
[45] Oct. 16, 1973

[54] GEL FOR ELECTROPHORESIS
[76] Inventor: Franklin R. Elevitch, 430 Nevada St., Palo Alto, Calif. 94301
[22] Filed: Sept. 11, 1972
[21] Appl. No.: 287,853

[52] U.S. Cl............................ 204/299, 204/180 G
[51] Int. Cl.............................................. B01k 5/00
[58] Field of Search.................... 204/180 S, 180 G, 204/180 R, 299

[56] References Cited
UNITED STATES PATENTS
3,558,459   1/1971   Granstrand et al............. 204/180 G
3,582,490   6/1971   Zemel............................. 204/180 G Primary Examiner—John H. Mack
Assistant Examiner—A. C. Prescott
Attorney—Edward B. Gregg

[57] ABSTRACT

Permeable aqueous gel of a type suitable for electrophoretic separation of proteins and other components of biological fluids such as blood serum, such gel containing as the base component of the buffer system a low molecular weight amino alcohol, also apparatus containing such gel.

20 Claims, 3 Drawing Figures

GEL FOR ELECTROPHORESIS

This invention relates to a permeable aqueous gel which is suitable as a medium for the separation of components of biological fluids by electrophoresis. Such gels are coming increasingly into use for the separation, detection and quantitative determination of proteins in blood serum by the technique of electrophoresis followed by drying and staining of the gel and determination of the individual separated components by fluorometry or densitometry.

The field of use and particular advantages of the present invention can be illustrated as follows: Blood serum contains a spectrum of globulins including the alpha globulins, the beta globulins and the gamma globulins. These can be separated by introducing a specimen of serum into a well formed in a film of agarose gel, such as described in my U.S. Pat. No. 3,479,265, and subjecting the film of gel to the voltage gradient in an electrophoresis apparatus. The separated globulins can then be treated by suitable procedures to cause them or to cause a co-enzyme or to cause a substrate which is modified by enzymatic action to result in a colored or fluorescent product. The fluorescence or color can be measured in a fluorometer or densitometer so as to measure the globulins quantitatively.

Gels used heretofore for such purposes, of which agarose gel, such as that described in my U.S. Pat. No. 3,479,265, are preferred, require buffers to maintain a suitable pH, typically about 8.6, but in certain cases as high as 9 and in other cases as low as 7. The acid component of such buffer systems is typically hydrochloric acid, but other acids such as barbituric acid, morpholino ethane sulfonic acid, boric acid and ethylene diamine tetra-acetic acid may also be used. The base component is typically sodium barbital. To effect good separation (i.e., a wide spread among the alpha globulins, the beta globulins and the gamma globulins) and more particularly to effect a good resolution within a group, such as alpha and beta globulins, has been difficult. Gel systems prepared from acrylamide or starch provide a molecular sieve effect which aids in resolution, but such gels are difficult and tedious to prepare. Agarose gels, as commonly used for electrophoresis, are much better suited for manufacturing techniques as disposable items, and are simple to use at the customer end. However, they do not function as molecular sieves. Accordingly, resolution of closely related proteins, such as the alpha and beta globulins, is difficult. Agarose gels having a higher concentration of agarose, e.g., 5–10 percent, function as molecular sieves but are difficult to prepare and use.

The importance of resolving power may be illustrated by the following: The beta globulin group of serum proteins contains the beta lipo-proteins which are carriers of lipids in the blood plasma, the C'–3 component of the complement system which augments the immune system, and transferrin which carries elemental iron in the blood plasma.

Diagnostic and prognostic techniques involving analysis of serum proteins has reached a stage such that resolution of alpha and beta globulins is important and if it can be done with disposable gel devices very quickly by electrophoresis followed by fluorometry or densitometry, considerable advantages result. However, by techniques and apparatus heretofore available, including electrophoresis and employing agarose gels, such resolutions have been difficult to achieve, or to achieve consistently.

It is an object of the present invention to provide improvements in aqueous permeable gels of the type adapted for use in electrophoretic separation of components of blood serum and other biological materials.

It is a further object of the invention to provide gel systems, more particularly agarose gel systems, which are capable of fine resolution and are, for example, suited for the good resolution of alpha and beta globulins of serum and other biological fluids.

The above and other objects of the invention will be apparent from the ensuing description and the appended claims.

As stated above, gels used for electrophoretic separation of components of biological fluids are buffered.

I have discovered that certain significant advantages result from the use of a small but effective amount of a low molecular weight aliphatic amino alcohol as the base component or as a part of the base component of the buffer system of a permeable aqueous gel of the type described above, and especially if the gel is an agarose gel.

Similar advantages are obtainable by the use of such amino alcohols in other permeable media which are used for electrophoretic separation of components of biological fluids and which require buffer system. For example, cellulose acetate is widely used for such purposes and it is buffered to maintain a suitable pH. The amino alcohols of the present invention may be used in cellulose acetate as the base component, or as part of the base component of such cellulose acetate media. Cellulose acetate suitable for such purposes is described, for example, in a paper by Gamblin in Medical Lab for November 1968, page 22–25 and is provided by Millipore Corporation of Bedford, Massachusetts and Gelman Instrument Company of Ann Arbor, Michigan.

The amino alcohol may be used as the entire base component of the buffer system, or it may be used in conjunction with another base component such as sodium barbital. The preferred amino alcohol is 2-amino-2-methyl-propan-1-01, which has the formula:

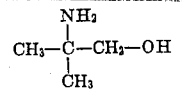

Other low molecular weight ($C_2$ to $C_8$) aliphatic amino alcohols may be used, such as 2-amino-butan-1-01; 2-amino-2-methyl-butan-1-01; 3-amino-2-methyl-propan-1-01; 3-amino-butan-1-01; 2-amino-pentan-1-01; 3-amino-pentan-1-01; 2-amino-hexan-1-01; also isomers of any of the above wherein the hydroxyl group occupies an interior position (i.e., the alcohol is a secondary or tertiary alcohol); also dihydric alcohols such as 2-amino-2-methyl-propan-1, 3-diol, etc.

AMP has been used heretofore in the incubation of gels, including agarose gels, after electrophoretic separation has been accomplished and during the incubation period when the separated proteins are caused to react with the substrate. See for example Demetriou and Beattie "Electrophoretic Separation on Agarose Thin Film of Isoenzymes of Alkaline Phosphatase from Human Serum and Tissue" in Clinical Chemistry, Vol. 17, pp 290 to 295 (1971). Also AMP has been used as a buffer medium in the total determination of isoenzymes in an aqueous solution. See, for example, Johnson "A New Fluorometric Method for the Estimation or Detection of Total and Fractionated Alkaline Phosphates," Clinical Chemistry, Vol. 15, pp 108 et seq. (1969). However, as far as I know, AMP has not been used in the gel itself during electrophoretic separation of materials.

The gel in which the amino alcohol is incorporated may be an agar, agarose, acrylamide or starch gel or any other gel that is suitable for electrophoretic separation and subsequent determination of serum proteins and the like, but agarose gels are preferred. All of these gels may be prepared as described in the scientific and patent literature, e.g., in my U.S. Pat. No. 3,479,265 and in the Bodman, Raymond, Raymond et al and Smithies papers cited therein.

The quantity of amino alcohol incorporated in the gel is small but sufficient to provide, together with the acid component of the buffer system (and with any additional base component if desired), a pH suitable for electrophoresis; for example, about 8.2 to 9.5, usually about 8.6. Molarities of about 0.005 to 0.20, preferably about 0.02 to 0.08, mols per liter of water used in the gel may be used.

Examples of suitable gel formulations are set forth in the examples below.

Such gels incorporating an aliphatic amino alcohol as the base component, or as a part of the base component, of the buffer systems, are useful for general protein analysis and for the separation and determination of specific proteins such as lipoproteins, lactate dehydrogenase isoenzymes, alkaline phosphatase isoenzymes, creatine phosphokinase isoenzymes, hemoglobin, haptoglobin, amino acids, etc. The amino alcohols have the effect of augmenting resolution and/or sensitivity. By "sensitivity" is meant the rate at which given isoenzymes react with their respective subsstrates. An advantage of augmented sensitivity is that it avoids the need to concentrate biological fluids as by the use of dialysis or polyacrylamide rods, which are commonly used where the fluid specimens are deficient in the isoenzyme which is to be determined.

The gel of the present invention may be used in various forms. A preferred form is that described in my U.S. Pat. No. 3,479,265 and illustrated in FIGS. 1,2, and 3 below.

Figure 1:
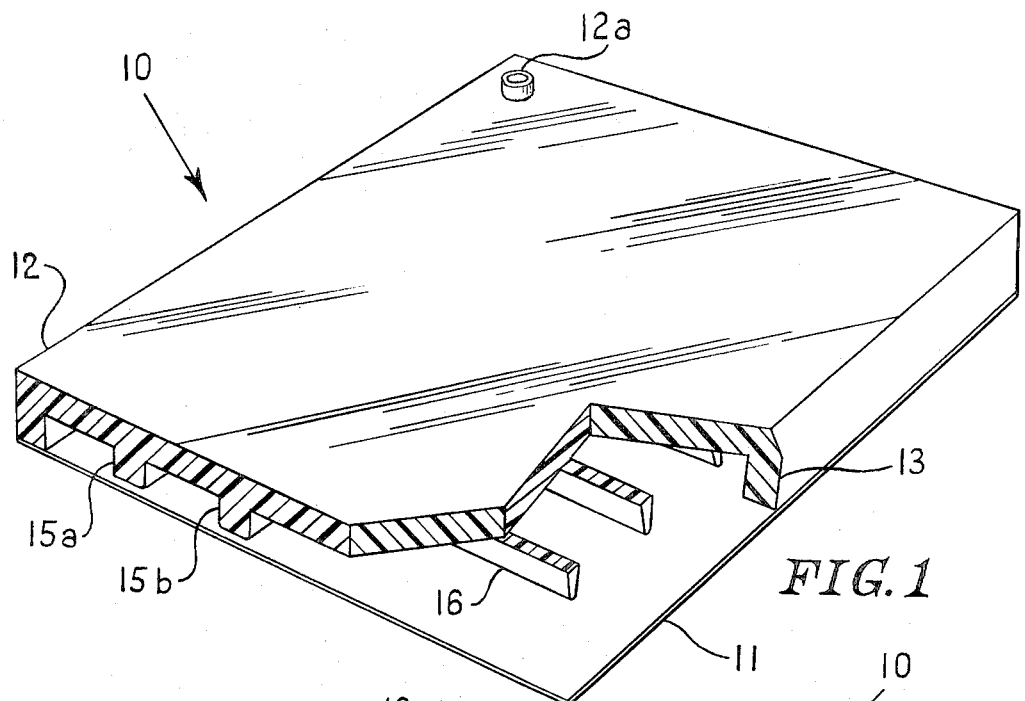
FIG. 1 is a perspective view shown in transverse cross section and also shown partly broken away.
Figure 2:
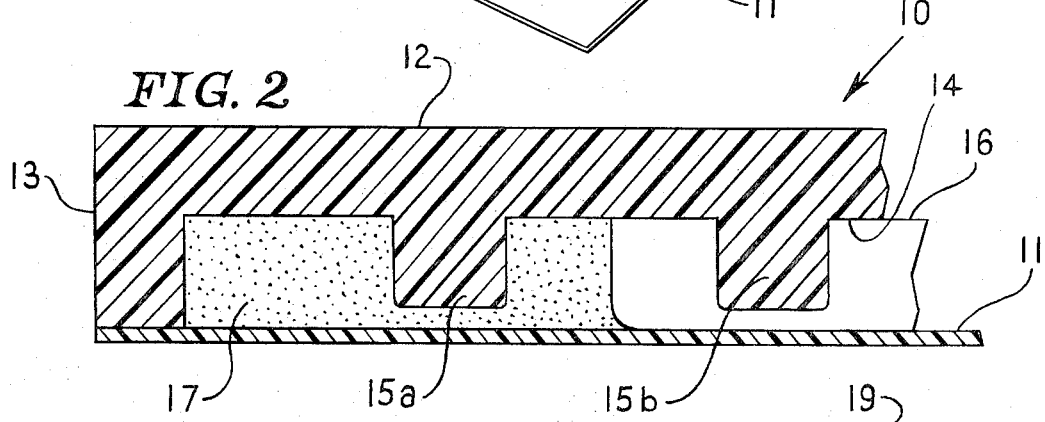
FIG. 2 is a fragmentary transverse section shown on a larger scale than that of FIG. 1.

Referring to these figures, the apparatus is indicated generally by the reference numeral 10 and comprises a base 11 and a cover 12. The cover is formed with a pair of openings 12a, one of which is shown. The base 11 and cover 12 may be made of any suitable material, preferably a transparent, high-optical clarity, low water-absorbant, low fluorescent plastic. For example, both the base 11 and the cover 12 may be made of polystyrene or other suitable plastic material. Agarose gels have the desireable property of adhering to the base 11. Adherence to the cover 12 can be avoided by the use of a release agent as described below. The cover may be made of polyethylene or polypropylene, which is non-adherent to agarose gels. The base 11 is preferably flexible and the cover 12 is preferably rigid. The cover 12 has a rim 13 extending about its long and short sides which serves to space it from the base when the two are brought together, thereby forming a cavity 14. This cavity has a thickness equal to that of the desired film of gel and, although it is shown on an exagerated scale for purposes of clarity, such cavity depth and film thickness are preferably less than 1 mm. and most advantageiously about 0.5 mm. or less. The cover 12 is formed integrally with pairs of downwardly projecting portions 15 a and 15 b which are intended to form sample receiving wells as explained hereafter. Preferably these projecting members do not extend quite to the base 11 for a reason explained hereinafter. Spacer members 16 are also provided which, like projections 15 a and 15 b, are integral with the cover 12. These spacer members extend to the base 11 and perform the important function of spacing the flexible base 11 from the cover 12 to provide a cavity of uniform thickness and thereby form a film of gel of uniform thickness.

The cavity 14 is filled through one of the openings 12a while the other opening serves as an outlet for air which is expelled as the cavity 14 is filled. This gel, as noted above, is preferably an agarose gel but it may be another type of gel, for example, starch or acrylamide. If the gel is an agarose gel, it is warmed to make it fluid for pouring into the cavity 14 and is allowed to solidify in the cavity by cooling. If a polymerizable material such as acrylamide is used with a catalyst, the filling operation may be carried out at room temperature. The surface properties of the gel 17 and the base are such that they will adhere one to the other. This may be accomplished by the fact that agarose gel will adhere to a polyetyrene surface. Its adherence to the inner surface of the cover 12 may be prevented by choice of a material to which the gel is non-adherent, e.g., polyethylene or by application of a suitable release agent such as a silicone release agent or a paraffin coating as described in my U.S. Pat. No. 3,635,808. The bottom surface of the rim 13 and/or the margin of the base 11 are coated with a pressure-sensitive adhesive so as to firmly secure the cover to the base. Preferably this adhesive is water resistant so that it does not deteriorate through action of the water and the gel. Alternatively the rim 13 and the margin of the base 11 may be heat sealed. Although edge sealing is preferred, it may be omitted where other means of preventing evaporation of water are employed or when a dried gel is employed to be reconstituted by addition of water at the time of use. Dried, reconstitutable gels suitable for use with the buffer-systems of the present invention are described in my Pat. No. 3,479,265 and in Renn U.S. Pat. No. 3,527,712.

Figure 3:
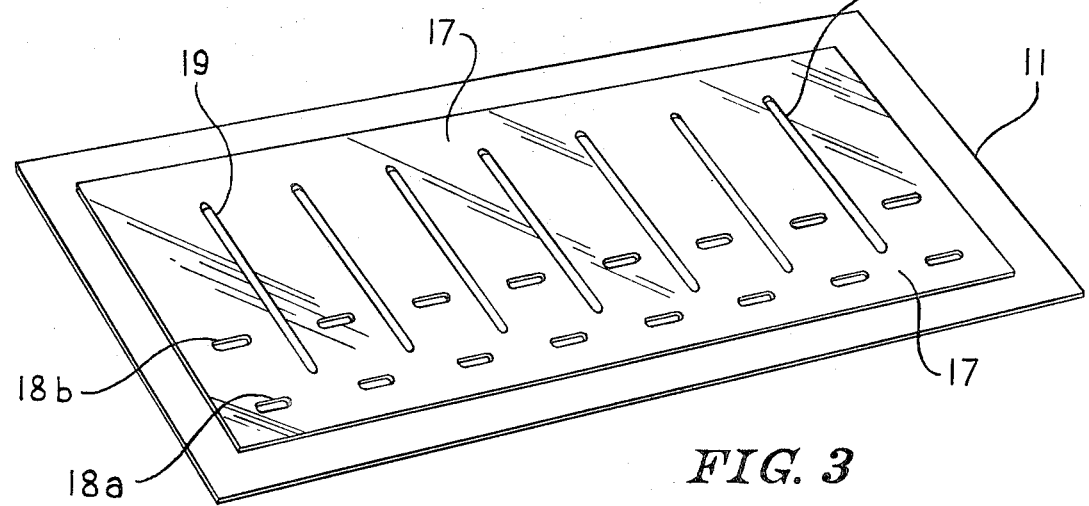
FIG. 3 is a perspective view of the base portion of the apparatus of FIGS. 1 and 2 shown stripped from the cover portion and with a film of gel adhering thereto.

The film 17 of liquid gel solidifies on cooling to room temperature or by catalytic action where polymerization occur. When it is desired to employ the film for analysis, the base 11 is stripped from the cover 12 to provide a device as shown in FIG. 3. As there shown, the film of gel 17 is formed with pairs of sample-receiving wells 18 a and 18 b and with slots 19 which are formed by the spacers 16. Inasmuch as the well-forming projections 15 a and 15 b do not extend to the base 11, the sample receiving wells 18 a and 18 b likewise do not extend to the base 11. This is advantageous in that it avoids undercutting of the wells, which may occur if the wells extend to the base 11.

The specimens to be analysed are placed in one or more of the wells 18 a and 18 b, for example, in the manner described in my U.S. Pat. No. 3,479,265 and electrophoresis and measurement are carried out as described in that patent.

The following examples will illustrate the practice and advantages of the invention. In these examples, percentages are by weight per volume; e.g., 5 percent sucrose means 5 grams of sucrose per 100 milliters of water used in the gel. Molarities of AMP (2-amino-2-methyl-propan-1-01) are in mols per liter of water used in the gel.

EXAMPLE 1

5 percent sucrose
1 percent agarose
0.01 percent polyvinyl alcohol (PVA)
0.025 percent ethylene diamine tetra-acetic acid (EDTA)
0.08 mol AMP
HCl — quantity sufficient to adjust the pH to 8.6
Water — quantity sufficient to make 1000 parts by volume This gel is prepared as follows: Buffer solution (e.g., the water used to prepare 1,000 ml. of gel and containing AMP and HCl from stock solution. The sucrose, PVA, and agarose are dissolved in this solution and the solution is brought to a boil and de-aerated.

The function of the sucrose is to adjust the dielectric constant of the gel and to inhibit crystallization of buffer salts. Agarose functions as the gelling agent. The PVA functions to impart good release properties, e.g., from a cover of a package such as that shown in FIG. 1. The EDTA functions as an antibacterial agent at a pH above 8 and it also functions as a sequestering agent for heavy metal ions and keeps them from precipitating in the gel.

This gel gives excellent results in the separation and resolution by electrophoresis of the alpha and beta globulins such that, for example the alpha-1 and alpha-2 and beta globulins are resolved and it will, for example, bring about good resolution of the lipoproteins, the C'-3 component of the complement system, transferrin, etc. Such resolutions are obtainable with molecular sieve type gels, such as acrylamide gels and starch gels, but as stated above these gels are trouble-some to prepare and to use. Heretofore, as far as I know, it has not been possible, when using agarose gels, to obtain consistently good resolutions of a narrow group of closely proximated proteins such as those described above. With the gels of the present invention it is possible to accomplish such resolutions and to do so consistently.

EXAMPLE 2

5 percent sucrose
1 percent agarose
0.01 percent PVA
0.035 percent EDTA
0.025 mol AMP
HCl — quantity sufficient to adjust pH to 8.6
Water — to 1000 parts by volume This gel, prepared like the gel in Example 1, has a much lower molarity of AMP (0.025 instead of 0.08). This low molarity results in better resolution of the alkaline phosphatases from bone and liver which are in the alpha-2 region. This gel also resolves hemoglobins and haptoglobins. The higher molarity of Example 1 has the advantage of better resolution for purposes of general protein analysis as distinguished from analysis for a particular group of closely proximated proteins.

EXAMPLE 3

5 percent sucrose
1 percent agarose
0.035 percent EDTA
0.01 percent PVA
0.02 mol Na barbital
0.05 mol AMP
HCl — quantity sufficient to adjust pH to 8.6
Water — to 1000 parts by volume This gel prepared as in Example 1 is advantageous for the resolution and measurement of lactate dehydrogenase isoenzymes. AMP, if used alone, does not give as good resolution and sensitivity of this group of isoenzymes as does sodium barbital. The joint use of AMP and sodium barbital provides a wider spectrum of utility than either base alone.

The agarose gel employed as the preferred gel of the present invention may contain varying percentages of agarose e.g., 0.5 to 10 percent (i.e., 0.5 to 10 grams per 100 milliters of water in the gel). With the higher concentrations, a molecular sieve effect is obtained. Sucrose (or other mono- or disaccharides such as glucose, mannose, fructose, galactose, ribose, arabinose, maltose, cellobiose, lactose, etc.) may be used in varying amounts e.g., 1–10 percent. The polyvinyl alcohol may be used in varying amounts e.g., 0.001 percent to 0.2 percent. A suitable polyvinyl alcohol is a 99 percent hydrolyzed (i.e., 99 percent of the acetyl groups of polyvinyl acetate are removed by hydrolysis), having a viscosity of 28–32 centipoises in a 4 percent aqueous solution. I have found that the inclusion of polyvinyl alcohol considerably improves the release properties of the gel from the cover.

It will, therefore, be apparent that novel and useful gels and gel devices are provided.

I claim:

1. An electrophoresis medium capable of serving as a medium for the transport of components of biological fluids by electrophoresis, said medium containing a buffer system including a base component and an acid component, said base component comprising in at least a substantial part of a low molecular weight aliphatic amino alcohol.

2. The medium of claim 1 containing a gelling agent capable of forming an aqueous gel consisting predominantly of water.

3. The medium of claim 2 in the form of an agarose gel.

4. The medium of claim 2 in dry form and capable of being reconstituted in gel form by the addition of water.

5. The medium of claim 1 in the form of cellulose acetate.

6. An aqueous permeable gel comprising water as a major component, a gelling agent which is compatible with electrophoresis of biological fluids to separate components thereof such as enzymes, and a buffer medium effective to maintain a pH in the gel suitable for such separation, said buffer medium including as at least a substantial part of the base component a low molecular weight amino aliphatic alcohol.

7. The aqueous permeable gel of claim 6 wherein the amino aliphatic alcohol is 2-amino-2-methyl-propan-1-01.

8. The gel of claim 6 wherein the gelling agent is agarose.

9. The gel of claim 6 wherein the amino aliphatic alcohol is 2-amino-2-methyl propan-1-01 and the gelling agent is agarose.

10. An aqueous agarose gel suitable for use as an electrophoresis medium to separate components of biological fluids by electrophoresis, said gel having agarose as a major gelling agent and being buffered by an acid-base system to a pH suitable for electrophoretic separation of proteins in biological fluids, the base component of the buffer system including as a substantial component a low molecular weight aliphatic amino alcohol.

11. The gel of claim 10 wherein the alcohol is 2-amino-2-methyl-propan-1-01.

12. The gel of claim 11 including a component which facilitates release of the gel from a hydrocarbon coated surface.

13. The gel of claim 12 wherein said component is polyvinyl alcohol.

14. The gel of claim 13 wherein the aliphatic amino alcohol is 2-amino-2-methyl-propan-1-01.

15. The gel of claim 11 including sodium barbital as a portion of the base component of the buffer system.

16. A disposable article comprising an impermeable base, an impermeable cover and a thin layer of aqueous permeable gel between said base and cover, said gel being adherent to the base and non-adherent to the cover, whereby the base may be stripped from the cover with the gel adhering thereto, said gel being buffered to maintain a pH suitable for electrophoretic separation of proteins in blood serum, the buffering medium including as at least a substantial part of the base component a low molecular weight aliphatic amino alcohol.

17. The apparatus of claim 16 wherein the alcohol is 2-amino-2-methyl-propan-1-01.

18. The article of claim 16 wherein the gel is an agarose gel.

19. The article of claim 16 wherein the cover and the base are in edge-sealing relationship.

20. The article of claim 16 wherein the base component of the buffering medium contains also a substantial proportion of sodium barbital.

* * * * *